L. W. BUGBEE & E. D. TILLYER.
PUPILOMETER.
APPLICATION FILED NOV. 24, 1917.
1,266,208.
Patented May 14, 1918.
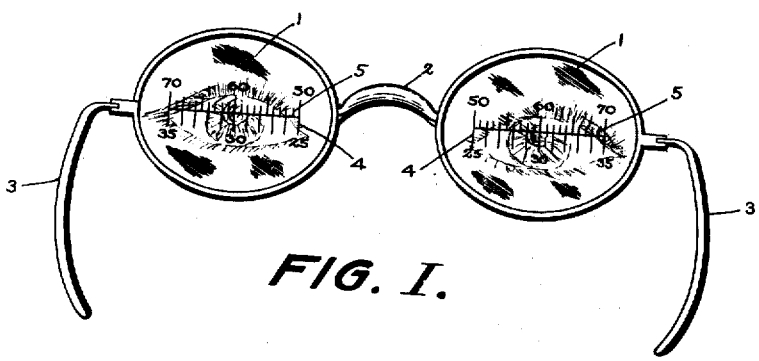
FIG. I.
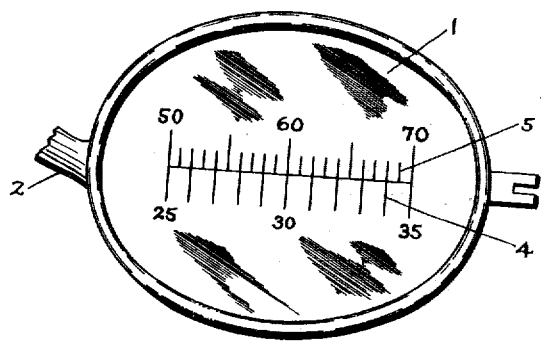
FIG. II.
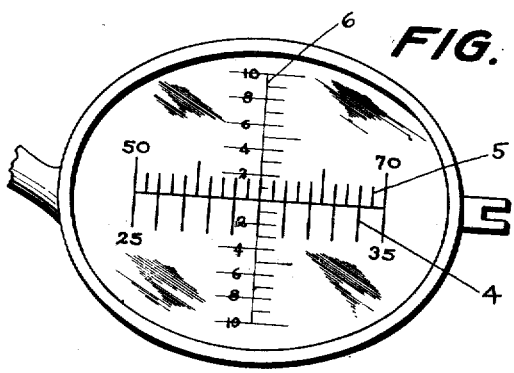
FIG. III.
INVENTOR
E. D. TILLYER & L. W. BUGBEE
BY
H. H. Styll   H. H. Parsons
ATTORNEYS

UNITED STATES PATENT OFFICE.

LUCIAN W. BUGBEE AND EDGAR D. TILLYER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

PUPILLOMETER.

1,266,208.

Specification of Letters Patent. Patented May 14, 1918.

Application filed November 24, 1917. Serial No. 203,838.

*To all whom it may concern:*

Be it known that we, LUCIAN W. BUGBEE and EDGAR D. TILLYER, citizens of the United States, residing at Southbridge, in the county of Worcester and State of Massachusetts, have invented certain new and useful Improvements in Pupillometers, of which the following is a specification.

This invention relates to new and useful improvements in measuring instruments and more particularly to what is known as a pupillometer constructed along the line of a pair of spectacles having plain lenses provided with graduations.

The main object of our invention is to provide a pupillometer of the above character whereby the pupillary distance may be readily obtained, that is the distance between the pupils of each eye and the distance between each pupil and the nose, so that the correct pupillary distance may be obtained, thus assuring of the proper fit of the glasses when applied to the wearer.

Another object of the present invention is the construction of a pupillometer which includes in its construction a frame in which is mounted a pair of lenses provided with the series of graduations of a scale which is well known in the optical art for obtaining pupillary distance.

With the above and other objects in view the invention consists in the novel features of construction and the combination and arrangement of parts to be hereinafter more fully described, pointed out in the claims and shown in the accompanying drawings, in which:

Figure I is a front elevation of our improved pupillometer showing the same applied to the eyes.

Fig. II is an enlarged front elevation of one lens showing in detail the graduations of our improved pupillometer. And Fig. III is an enlarged front elevation of a slightly modified form of the invention illustrating the graduations extending both ways of the lenses.

In the construction of our improved pupillometer we use a frame of the spectacle type having the lenses 1 arranged therein and provided with the usual nose piece 2 and the temples 3. It is customary for an optician to measure the pupillary distance of a person's eyes before fitting them with glasses so as to secure the proper foci and to this end our invention consists of a pair of spectacles as shown wherein the lenses are provided with a series of graduations arranged one above the other and disposed in the proper position according to the proportion of the lens thus providing an accurate pupillometer which when applied to the face will give the exact distance between the pupils of the eyes and also the distance from the nose bridge to each pupil.

The graduations as illustrated on our improved pupillometer are divided into millimeters and half millimeters the lower graduations 4 which are divided in millimeters being used to obtain the distance from the nose bridge to the pupil of either eye, while the upper graduations 5 are divided into half millimeters and used for obtaining the exact distance from the pupil of one eye to the pupil of the other eye. It will be noted that the upper series of graduations 5 are arranged on a scale double that of the lower series of graduations 4 so that the pupillary distance and the distance of each pupil from the nose bridge may be readily obtained at the same time.

It is a well known fact that the millimeter scale is now being used for the purpose of measuring pupillary distance, but while I have shown and described this form of scale it will be understood that any other scale well known in this art may be used equally as well with the same result. In the use of our improved pupillometer, the same is applied to the face in the same manner as an ordinary pair of spectacles and the lower graduations 5 readily used for obtaining the pupillary distance from the nose bridge to either pupil, while the upper graduations will readily indicate the distance from one pupil to the other, thus carrying out the two operations at the same time.

From the above description taken in connection with the accompanying drawings it will be readily apparent that we have provided a simple and efficient pupillometer wherein the graduations may be applied to any well known type of spectacle that can be readily applied to the face, other than the type illustrated, whereby pupillary distance from the nose bridge to either pupil or the distance from one pupil to the other may be readily obtained at one operation.

In Fig. III we have illustrated a slightly modified form of the invention wherein the graduations 6 are extended in both directions on the lens in order that a correct foci may be obtained should one eye of a person be disposed somewhat above or below the line of the other eye whereby the correct position of the eyes with respect to each other may be obtained. From this it will be apparent that crooked or unalined eyes may be readily measured to obtain the proper foci.

Claims:

1. The combination with a pair of spectacles including lenses, of a series of graduations arranged in superimposed relation upon each lens, the lower of said graduations being divided into millimeters for measuring the distance from the nose to each pupil and the upper of said graduations being double that of the lower series and divided into half millimeters for measuring the distance from pupil to pupil.

2. A pupillometer including a lens having lines arranged thereon, a series of graduations being arranged on opposite sides of said lines and the graduations upon one side of the lines being double that of the other side.

3. A pupillometer including a lens having a longitudinal and transverse line thereon, graduations being disposed upon opposite sides of the lines and the graduations upon one side of the lines being double that of the other side.

4. A pupillometer including lenses, having a series of graduations upon each lens extending laterally and longitudinally thereof, and each series of graduations including millimeters and half millimeters arranged in opposed relation.

5. A pupillometer including lenses each having lines extending laterally and longitudinally thereof, a series of millimeter graduations arranged upon one side of each of said lines and a series of half millimeter graduations arranged upon the opposite side of said lines as and for the purpose set forth.

In testimony whereof we have affixed our signatures in presence of two witnesses.

LUCIAN W. BUGBEE.
EDGAR D. TILLYER.

Witnesses:
ESTHER M. LAFLER,
H. E. COLEMAN.